United States Patent

Johansson et al.

[11] 4,094,833
[45] June 13, 1978

[54] VINYLIC GROUP CONTAINING DEXTRAN DERIVATIVE GEL IN PARTICLE FORM FOR SEPARATION PURPOSES

[75] Inventors: Haldor Ingemar Johansson; Dag Torsten Lindström; John Lennart Söderberg, all of Upsala, Sweden

[73] Assignee: Pharmacia Fine Chemicals AB, Uppsala, Sweden

[21] Appl. No.: 745,904

[22] Filed: Nov. 29, 1976

[30] Foreign Application Priority Data

Dec. 12, 1975 Sweden .................................. 7514092

[51] Int. Cl.² .............................................. C08L 5/02
[52] U.S. Cl. ........................... 260/17.4 GC; 210/31 C; 260/17.4 ST; 536/51; 536/112
[58] Field of Search ............... 260/17.4 ST, 17.4 GC; 536/51, 112; 210/31 C

[56] References Cited

U.S. PATENT DOCUMENTS

| | | | |
|---|---|---|---|
| 2,855,373 | 5/1959 | Novak .................... | 260/17.4 |
| 2,868,781 | 1/1959 | Gaertner et al. ......... | 536/112 |
| 3,042,667 | 7/1962 | Flodin et al. ........... | 536/112 |
| 3,208,994 | 9/1965 | Flodin .................. | 536/112 |
| 3,561,933 | 2/1971 | Restaino et al. ......... | 260/17.4 |
| 3,635,857 | 1/1972 | Restaino ................ | 260/17.4 |
| 3,706,661 | 12/1972 | Tangen et al. ........... | 210/31 C |
| 3,826,767 | 7/1974 | Hoover et al. ........... | 260/17.4 |
| 3,989,656 | 11/1976 | Kamiya et al. ........... | 260/17.4 |

FOREIGN PATENT DOCUMENTS

| | | | |
|---|---|---|---|
| 974,054 | 11/1964 | United Kingdom ......... | 260/17.4 |
| 392,627 | 7/1973 | U.S.S.R. ................ | 210/31 C |

OTHER PUBLICATIONS

Chem. Absts. 82:141801s, Synthesis of Unsaturated Derivatives of Cellulose and Dextran, Kolova et al.

*Primary Examiner*—Edward M. Woodberry
*Attorney, Agent, or Firm*—Fred Philpitt

[57] ABSTRACT

A dextran derivative gel in particle form for use in the separation of substances according to their molecular size and/or electrical charge by means of gel-chromatographic and/or ion exchange techniques is disclosed which gel comprises a copolymerizate obtained by the free-radical copolymerization of a dextran derivative containing vinyl and/or substituted vinyl groups with (a) a divinyl compound of the formula

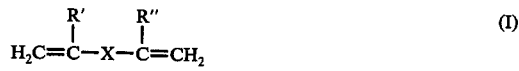

wherein R' and R" are equal or different and each represent hydrogen or methyl and X is

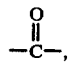

—SO₂— or the group

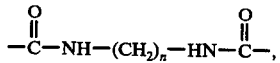

wherein $n$ is an integer from 1 to 6, inclusive, and optionally (b) a low-molecular weight monovinyl compound.

2 Claims, No Drawings

VINYLIC GROUP CONTAINING DEXTRAN DERIVATIVE GEL IN PARTICLE FORM FOR SEPARATION PURPOSES

The present invention relates to a particulate dextran derivative gel for use in the separation of substances according to their molecular size and/or electrical charge by means of gel chromatographic and/or ion exchange techniques.

Chromatographic media based on dextran and intended for use in gel chromatography and ion exchange chromatography are previously known, for example, from U.S. Pat. Nos. 3,042,667 and 3,208,994. These media are prepared by cross-linking dextran with dialkylating substances, such as diepoxides and epichlorohydrin. Gels prepared in this manner, however, have a limited porosity which renders separation of substances having a high molecular weight impossible. The upper limit is realised in practice at molecular weights of 300,000 – 400,000. A further serious disadvantage with hitherto known dextran gels is the poor rigidity of the most porous gels. This renders chromatography in columns difficult, particularly with regard to large columns used in industry, since the flow of specimen through the column is, in this case, excessively low.

It has now surprisingly been found possible to prepare certain dextran derivative gels which have a greatly increased porosity in comparison with previously known dextran derivative gels, so that substances having molecular weights of several millions can be separated. Further, the rigidity of the gels according to the invention is much higher than the rigidity of prior known dextran derivative gels of corresponding porosity, so that a good rate of flow is obtained, even when used in large columns.

The dextran derivative gels according to the invention are characterised by the fact that they comprise a copolymerisate obtained by the free-radical copolymerisation of a dextran derivative containing vinyl and/or substituted vinyl groups with (a) a divinyl compound of the formula

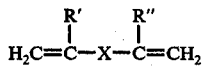
(I)

in which R' and R" are the same or different and each represent hydrogen or methyl, X is

—SO$_2$— or the group

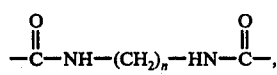

wherein $n$ is an integer from 1 to 6, and optionally (b) A low-molecular weight monovinyl compound.

In accordance with a preferred embodiment of the gel according to the invention, the degree of substitution of the vinyl and/or substituted vinyl groups in the starting dextran derivative is 0.05 – 2, preferably 0.1 – 1,5 mmol/g of dextran derivative.

Suitably, the copolymerisate is obtained by the free-radical copolymerisation of a mixture of 20 – 80% by weight dextran derivative containing vinyl and/or substituted vinyl groups, 20 – 80% by weight divinyl compound and 0 – 40% by weight monovinyl compound calculated on the total weight of the reactants.

Those dextran derivatives which can be used as the starting material for the gel in accordance with the invention include, in principle, all dextran derivatives containing groups of the formula CH$_2$ = CR—, in which R is a hydrogen atom, a methyl group, a trifluoromethyl group, a fluorine, chlorine, or bromine atom or a cyano group. A preferred group of substituents can be summarised by the formula

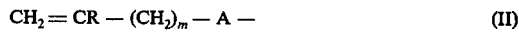

in which $m$ is 0, 1 or 2, R has the aforementioned significance and A is an ether, ester or amide bridge or, when $m$ is 0, also the group —CO—CH$_2$— wherein A connects the group of formula (II) directly to the dextran molecule at one of its hydroxyl groups or across an aliphatic bridge, optionally containing hydroxyl groups, which is ether bound or ester bound to the dextran molecule at one of its hydroxyl groups. Examples of such vinyl or substituted vinyl grops include vinyl, 1-methylvinyl, 1-(trifluoromethyl)vinyl, 1-fluorovinyl, 1-chlorovinyl, 1-bromovinyl, cyanovinyl, allyl, 2-fluoroallyl, 2-chloroallyl, 2-bromoallyl, 2-(trifluoromethyl)allyl, 2-cyanallyl, methallyl, acryl, methacryl, 3-allyloxy-2-hydroxypropyl and 3-(acrylamido)-2-hydroxypropyl.

As will readily be perceived, the dextran derivative may also contain other substituents with or without ion-exchanging groups, such as hydroxyalkyl with preferably 2 – 5 carbon atoms such as hydroxyethyl, 2-hydroxypropyl, 2,3-dihydroxypropyl, epoxyalkyl, for example epoxypropyl, or alkyl with preferably 1 – 5 carbon atoms, such as methyl or ethyl or aralkyl such as benzyl, carboxyalkyl, for example carboxymethyl, sulphoalkyl, for example sulphoethyl or sulphopropyl, aminoalkyl, preferably dialkylaminoalkyl, for example diethylaminoethyl, quaternised such groups triethylammoniumethyl or diethylhydroxypropylammoniumethyl.

The average molecular weight of the dextran derivative may have practically unlimited variation. A suitable weight average molecular weight (M$_w$), however, is 3000 – 10,000,000, for example, 70,000 – 5,000,000.

The dextran derivative containing vinyl and/or substituted vinyl groups and serving as the starting material can be prepared in the following manner:

Allylic dextran ethers were prepared by treating a strongly alkaline aqueous solution of dextran or dextran derivative with, for example, allyl bromide, allyl glycidyl ether, methallyl chloride or dichloropropene.

Dextran derivatives containing ester or amide linkages were prepared by carefully adding, for example, methacrylic acid chloride or acrylic acid chloride to an aqueous solution of dextran or dextran derivative (for example 3-amino-2-hydroxylpropyldextran) in which the aqueous solution also contains, for example, pyridine or triethylamine.

Vinylic ethers can be prepared analogously with allyl ethers with, for example, 2-bromoethylvinyl ether or with chloromethyl vinyl ketone.

An example of divinyl compounds which can serve as starting material in accordance with the invention include N,N'-methylene-bisacrylamide, divinyl ketone and divinyl sulphone.

The low-molecular weight monovinyl compound may, in principle, comprise any known low-molecular weight compound containing a vinyl or substituted vinyl group, preferably the group $CH_2 = CR-$, in which R has the aforementioned significance, and is soluble in water, methanol, ethanol or aprotic polar organic solvents. By "low molecular weight" is meant here that the compound in question suitably contains at most 20 C-atoms, preferably at most 10 C-atoms. Examples of low-molecular weight vinyl compounds for use as starting material in the gel according to the invention include acrylamide, methacrylamide, N-hydroxymethylacrylamide, 2-hydroxyethylmethacrylate, vinyl acetate, acrylonitrile, acrylic acid, N,N-dimethylaminoethylmethacrylate, glycidylmethacrylate, diacetoneacrylamide.

Copolymerisation of the vinyl derivative of dextran and the low-molecular weight di- and monovinyl compounds is effected under suitable conditions known with free-radical polymerisation techniques. Preferably, the reaction is effected in aqueous solution. For example, persulphate or peroxide can be used as an initiator. These initiators may also be combined with amino compounds which accelerate the formation of radicals. Examples of such accelerators include 3-dimethylaminopropionitrile and tetramethyl-1,2-diaminoethane. Further, a redox-system of the type $H_2O_2$—$Fe^{2+}$, $S_2O_8^{2-}$—$HSO_3^-$ and $SO_3^{2-}$—$ClO_3^-$ can be used.

The gel according to the invention can be produced in block form and then finely disintegrated to particles which can be packed in columns for chromatography. In order to obtain a good flow rate through the columns, the gel is preferably produced in bead form. This can be done using known bead polymerisation methods. The dextran derivative and monomers together with initiators are dissolved in water or in a mixture of water and a water-miscible liquid, for example, water and an alcohol. The aqueous solution is then emulsified in a water-immiscible organic liquid, such as toluene, heptane or ethylene dichloride. In order to facilitate the emulsifying process and to provide the correct phase relationship (i.e. water phase in organic phase), there is suitably added an agent which lowers surface tension. To prevent the emulsion from coagulating during the polymerisation process, there is added a fine-grained material to prevent contact of the water droplets. To this end, a polymer which is soluble in the organic phase may also be used. The gel beads formed by the bead polymerisation process can be cleansed by slurrying the same or washing the same with acetic acid, organic solvents and water.

The gel particles according to the invention suitably have a size of 1 - 200 μm, preferably 5 - 150 μm.

The gels according to the invention are all insoluble in water and in other conventional, non-decomposing solvents and comprise structurally a three-dimensional network. Depending upon their structure, the gels are swellable in the aforementioned solvents to varying limited degrees, The invention will now be described more clearly with reference to a number of Examples.

EXAMPLE 1

100 g of fine-grain chalk coated with stearate and 25 g of dodecylphenoxypoly-(ethyleneoxy)-ethanol were admixed with 1000 ml of toluene and the mixture was heated to 50° C. 40 g of allyl-dextran ($M_w \approx 3,500,000$; degree of substitution 1.10 mmol allyl groups per g of dextran derivative) and 40 g of N,N'-methylenebisacrylamide were dissolved in a mixture of 375 ml of distilled water and 125 ml of methanol at 50° C. Subsequent to a clear solution being obtained, 5 g of ammonium persulphate were added. The water-methanol solution and the toluene mixture were brought together and stirred for 4 hours at 50° C in a nitrogen-gas atmosphere. Insoluble gel beads having a size of 50 - 140 μm had then been formed. The product was washed with acetic acid, acetone and water. Subsequent to sedimentation, the yield was measured to approximately 750 ml. The exclusion limit, i.e. the upper limit of the molecular weight range within which a separation according to molecular size is obtained, was determined in respect of the obtained products in a manner such that some proteins of different molecular weight were chromatographed through a bed of the product and the $K_{av}$-values of the proteins calculated according to the formula $$K_{av} = \frac{V_e - V_o}{V_t - V_o}$$

in which
$V_e$ = the volume of eluent
$V_o$ = the space between the gel grains
$V_t$ = the volume of the bed
$K_{av}$ = O indicates that the chromatographed substance is totally excluded from the pores of the separation medium.

The $K_{av}$-values measured in respect of the various proteins were plotted in a diagram against the logarithm of the molecular weight. The points in the diagram were joined by a straight line and the approximate exclusion limit was obtained at the point where the line intersected the abscissa. The exclusion limit was determined in this way as 290,000.

A measurement of the rigidity of the product was obtained by measuring the flow of liquid through a bed of the beads under defined conditions. To this end, the beads were slurried in water and packed in a glass column until a bed having a diameter of 5 cm and a height of 10 cm was obtained. A step by step increasing hydrostatic pressure drop was applied over the bed and the linear flow measured. In this way it was possible to determine the maximum flow ($U_{max}$) for the defined bed. ($U_{max}$ in this embodiment and in the following embodiments has been given with respect to gel beads having a mean diameter of 100 μm). The flow maximum ($U_{max}$) 95 ml/cm²/h. (For prior known, commercially available dextran derivative gels having an exclusion limit of 200,00 - 300,000, the flow maximum is 2 - 3 ml/cm²/h with a mean particle diameter of 100 μm.)

The starting material was allyl dextran which was prepared in the following manner:

400 g of dextran having an average molecular weight of 3,248,000 ($M_w$, $M_w/M_n$ = 27.75) were charged to a 5 l, 3-necked round flask together with 3000 ml of distilled water. Subsequent to a clear solution being obtained, 120 g of sodium hydroxide and 4 g of sodium borohydride dissolved in 500 ml of distilled water were added. Finally, 0.4 g of hydroquinone and 200 g of allyl bromide were added. The reaction was permitted to continue for 4 hours at 60° C whilst strongly agitating the solution. The reaction was interrupted by adding 100 g of concentrated acetic acid. Subsequent to the reaction mixture cooling, the allyl dextran was precipitated with 99% ethanol. The precipitate was dissolved in 1.5 l of distilled water, whereafter allyl dextran was reprecipitated with ethanol. This precipitation procedure was repeated 8 times. The terminal precipitate was dissolved in 2 l of distilled water. The solution was filtered and freeze-dried.

EXAMPLE 2

In a manner analogous with Example 1 but with the water-methanol mixture changed for solely water, there were charged to the system 25 g of dextran methacrylate ($M_w \approx 3,500,000$; degree of substitution 0.20 mmol/g dextran derivative), 27.5 g of methacrylamide and 22.5 g of N,N'-methylenebisacrylamide.

Yield approximately 800 ml.
Exclusion limit 300,000.
Flow maximum ($U_{max}$) 25 ml/cm$^2$/h.

The starting material was dextran methacrylate prepared in the following manner:

200 g of dextran having an average molecular weight of $M_w = 3,248,000$ ($M_w/M_n = 27.75$) were dissolved in 1800 ml of distilled water and the solution transferred to a 5 l, 3-necked round flask provided with an agitator. 480 ml pyridine and 0.15 g of hydroquinone were then added. 308 ml methacrylic acid chloride were then added dropwise for 1 hour. The flask was cooled during the addition of methacrylic acid chloride to a constant temperature of 20° C. The synthesis was permitted to continue under agitation for a further 4 hours. The dextran methacrylate was precipitated with 99% ethanol. The precipitate was dissolved in 1.5 l distilled water, whereafter the dextran methacrylate was reprecipitated with ethanol. The precipitation procedure was repeated 8 times. The terminal precipitate was dissolved in 2 l distilled water. The solution was filtered and freeze-dried.

EXAMPLE 3

In a manner analogous with Example 2, 25 g of allyl dextran (same molecular weight and degree of substitution as that in Example 1) were copolymerised with 27.5 g of acrylamide and 22.5 g of N,N'-methylenebisacrylamide.

Yield 800 ml.
Exclusion limit 330,000.
Flow maximum ($U_{max}$) 26 ml/cm$^2$/h.

EXAMPLE 4

In a manner analogous with Example 1, 34 g of allyl dextran ($M_w \approx 70,000$; degree of substitution 1.14 mmol/g dextran derivative) were copolymerised with 47.5 g N,N'-methylenebisacrylamide.

Yield 750 ml.
Exclusion limit 5,000,000.
Flow maximum ($U_{max}$) 130 ml/cm$^2$/h.

The starting material was allyl dextran prepared analogously with the allyldextran of Example 1 from a dextran having an average molecular weight ($M_w$) of 70,000.

EXAMPLE 5

In a manner analogous with Example 1, 34 g allyl dextran ($M_w \approx 500,000$; degree of substitution 1.20 mmol/g dextran derivative) were co-polymerised with 47.5 g of N,N'-methylenebisacrylamide.

Yield 750 ml.
Exclusion limit 280,000.
Flow maximum ($U_{max}$) 100 ml/cm$^2$/h.

The dextran used as starting material was prepared in a manner analogous with the allyl dextran of Example 1 using a dextran having an average molecular weight of 500,000.

EXAMPLE 6

In a manner analogous with Example 1, 34 g of 3-allyloxy-2-hydroxy-propyldextran ($M_w \approx 2,000,000$; degree of substitution 0.50 mmol/g of dextran derivative) were copolymerised with 47.5 g N,N'-methylenebisacrylamide.

Yield 700 ml.
Exclusion limit 210,000.
Flow maximum ($U_{max}$) 90 ml/cm$^2$/h.

The dextran derivative used as starting material was prepared in a manner analogous with the allyl dextran of Example 1, although in this case the allyl bromide was replaced with equal weight quantities of allyl glycidylether and the dextran was replaced with a dextran having an average molecular weight of 2,000,000.

EXAMPLE 7

In a manner analogous with Example 1 but while using n-heptane instead of toluene, 34 g of methallyldextran ($M_w \approx 3,500,000$; degree of substitution 0.64 mmol/g of dextran derivative) were copolymerised with 47.5 g, N,N'-methylenebisacrylamide.

Yield 750 ml.
Exclusion limit 4,000,000.
Flow maximum ($U_{max}$) 150 ml/cm$^2$/h.

EXAMPLE 8

In a manner analogous with Example 1, 42.5 g of 2-chloro-allyl dextran ($M_w \approx 3000$; degree of substitution 0.61 mmol/g of dextran derivative) were copolymerised with 47.5 g of N,N'-methylenebisacrylamide.

Yield 750 ml.
Exclusion limit approximately 20,000,000.
Flow maximum ($U_{max}$) 400 ml/cm$^2$/h.

The 2-chloroallyl dextran used as starting material was prepared in a manner analogous with the allyl dextran of Example 1, although in this instance the allyl bromide was replaced by an equal number of moles of 2,3-dichloropropene.

EXAMPLE 9

In a manner analogous with Example 1, 42.5 g of allyl dextran ($M_w \approx 70,000$; degree of substitution 1.14 mmol/g of dextran derivative) were copolymerised with 12.5 g of divinyl sulphone and 47.5 g of N,N'-methylenebisacrylamide.

Yield 800 ml.
Exclusion limit 450,000.
Flow maximum ($U_{max}$) 160 ml/cm$^2$/h.

EXAMPLE 10

In a manner analogous with Example 1, 30 g of allyl dextran ($M_w \approx 2,000,000$; degree of substitution 1.4 mmol/g dextran derivative) was polymerised with 20 ml of acrylic acid and 47.5 g of N,N'-methylenebisacrylamide.

The obtained weakly acidic cation exchanger had a total capacity of 0.24 meq/ml sedimented gel.

Yield 750 ml.
Flow maximum ($U_{max}$) 515 ml/cm$^2$/h.

The beads were packed in a chromatographic column and equilibrated with 0.05 M Na-phosphate buffer, pH 6.0. An artificial mixture of α-chymotrypsinogen, cytochrome c and lysozyme was applied on top of the bed. A continuous salt gradient was used to elute the three proteins. They were fractionated according to charge and left the column in the order α-chymotrypsinogen cytochrome c and lysozyme.

What is claimed is:

1. A dextran derivative gel in particle form for use in the separation of substances according to at least one property selected from the group consisting of molecular size and electrical charge by means of at least one technique selected from the group consisting of gel chromatographic and ion exchange techniques, which gel comprises a copolymerisate obtained by the free-radical copolymerization of a mixture of 20 - 80% by weight of a dextran derivative containing groups selected from the class consisting of vinyl and substituted vinyl groups, 20 - 80% by weight of a divinyl compound of the formula:

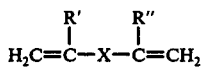 (I)

in which R' and R" are equal or different and each represent hydrogen or methyl, X is

—SO$_2$— or the group

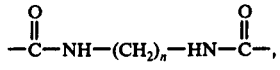

wherein $n$ is an integer from 1 to 6, and 0 - 40% by weight of a low-molecular weight monovinyl compound, calculated on the total weight of the reactants, the degree of substitution of groups selected from the class consisting of vinyl and substituted vinyl groups in the starting dextran derivative being 0.05 - 2 mmol/g of dextran derivative.

2. A dextran derivative gel according to claim 1 wherein said degree of substitution is 0.1 - 1.5 mmol/g of dextran derivative.

* * * * *